United States Patent
Feng et al.

(10) Patent No.: US 9,318,946 B2
(45) Date of Patent: Apr. 19, 2016

(54) OPTIMAL TRAJECTORY CONTROL FOR LLC RESONANT CONVERTER FOR SOFT START-UP

(71) Applicant: Virginia Tech Intellectual Properties, Inc., Blacksburg, VA (US)

(72) Inventors: Weiyi Feng, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 146 days.

(21) Appl. No.: 14/087,076

(22) Filed: Nov. 22, 2013

(65) Prior Publication Data

US 2014/0313790 A1  Oct. 23, 2014

Related U.S. Application Data

(60) Provisional application No. 61/814,939, filed on Apr. 23, 2013.

(51) Int. Cl.
| | | |
|---|---|---|
| H02M 3/337 | (2006.01) | |
| H02M 1/36 | (2007.01) | |
| H02M 1/00 | (2007.01) | |

(52) U.S. Cl.
CPC .............. *H02M 1/36* (2013.01); *H02M 3/3376* (2013.01); *H02M 2001/0058* (2013.01)

(58) Field of Classification Search
CPC ...................... H02M 3/33569; H02M 3/33507; H02M 3/33592; H02M 3/33523; H02M 3/3353; H02M 3/3385; H02M 3/337; H02M 2001/0058; H02M 1/36
USPC ........................ 363/21.02–21.03, 49; 323/901
See application file for complete search history.

(56) References Cited

U.S. PATENT DOCUMENTS

| | | | | |
|---|---|---|---|---|
| 4,853,832 A | * | 8/1989 | Stuart ................ | H02M 3/3376 363/17 |
| 2010/0067261 A1 | * | 3/2010 | Nakanishi ................ | 363/21.02 |
| 2013/0099590 A1 | * | 4/2013 | Ma et al. ........................ | 307/104 |

OTHER PUBLICATIONS

Jinhaeng Jang; Minjae Joung; Seokjae Choi; Youngho Choi; Byungcho Choi, "Current mode control for LLC series resonant dc-to-dc converters," Applied Power Electronics Conference and Exposition (APEC), 2011 Twenty-Sixth Annual IEEE , vol., no., pp. 21-27, Mar. 6-11, 2011.*

Yang, Bo. Topology Investigation for Front End DC/DC Power Conversion for Distributed Power System. Disserataion. Sep. 12, 2003. pp. 142-186.*

* cited by examiner

*Primary Examiner* — Harry Behm
*Assistant Examiner* — Peter Novak
(74) *Attorney, Agent, or Firm* — Whitham Curtis Christofferson & Cook, PC

(57) ABSTRACT

By setting switching instants of a switching circuit of a resonant power converter based on current in a resonant circuit reaching a current limit of a current limitation band, soft start-up of the power converter can be achieved to avoid or limit electrical stress with full control over a trade-off between time required to settle to a full load steady-state mode of operation and the amount of electrical stress permitted while soft start up switching frequency is automatically optimized.

20 Claims, 18 Drawing Sheets

OPTIMAL TRAJECTORY CONTROL FOR LLC RESONANT CONVERTER FOR SOFT START-UP

CROSS-REFERENCE TO RELATED APPLICATIONS

This application claims benefit of priority of U.S. Provisional Patent Application 61/814,939, filed Apr. 23, 2013, which is hereby incorporated by reference in its entirety.

FIELD OF THE INVENTION

The present invention generally relates to control of resonant power converters and, more particularly, to control of resonant power converters during soft start-up to limit voltage and current stress in the resonant circuit of the power converter.

BACKGROUND OF THE INVENTION

Many electrically powered devices and components thereof require power of a particular substantially constant voltage, referred to as a direct current (DC) voltage. Even if the device uses a battery for providing power, a power converter is often required to supply the particular voltage(s) required. Similarly, a power converter is required for charging of rechargeable batteries. Accordingly, power converters of many designs and topologies have been developed for a wide variety of applications.

Among known designs of power converters, resonant switching power converters have become popular due to their ability to limit switching losses and electrical stresses during operation as well as providing very high efficiency and reduced electromagnetic interference (EMI) noise compared with other types of power converters. Among resonant power converters, so-called LLC resonant converters are becoming increasingly attractive because of their flexibility of application, simplicity, efficiency, the simplicity of their control and their ability to provide over-current protection and deliver a range of voltages that may be well above the input voltage.

Typically, an LLC resonant converter will comprise a pair of switching transistors operated in a complementary fashion and a resonant circuit comprising a capacitor and two inductors; one of which generally comprises the magnetizing inductance of a winding of a transformer through which power is output to a rectifier, filter and/or regulator to provide power to an electrically powered device. An LLC resonant converter typically operates at a switching frequency near the resonant frequency, $f_0$, of the LLC circuit for highest efficiency. As an electrical load is increased and more power must be delivered, simple sensing and feedback of the output voltage to a voltage controlled oscillator (VCO) can be arranged to reduce the switching frequency and increase the voltage gain to automatically compensate for the increased required power and thus provide good voltage regulation over a wide range of current. By the same token, particular conditions of voltage, current or switching frequency can be sensed and the VCO can be controlled to increase the switching frequency to reduce gain of the power converter and thus provide a degree of over-current protection in a very simple and robust manner.

However, resonant converters inherently have a transient response at start-up when power is applied to them, either initially or after an interruption of operation. Such transient behavior generally involves substantial electrical stress that can damage the switches or other components and may continue for a substantial number of switching cycles, possibly in an oscillatory manner, until the resonant behavior assumes a steady state. The term "soft start-up" is generally applied to any power converter start-up process where the electrical stress is limited such that the power converter is not damaged by the start-up transients. Since generally unpredictable start-up transients are a characteristic of resonant converters, some soft start-up provisions are required.

To reduce the electrical stress during start-up, an LLC must be initially operated at a switching frequency above the resonant frequency but a suitably high frequency is difficult to predict. If the start-up frequency is too low, even if above the resonant frequency, large currents and voltages appear in the resonant circuit. If the frequency is too high, the switching frequency will generally decrease quickly during the soft start-up process and will merely delay the onset of the electrical stress. Further, as the switching frequency rapidly decreases, the current stress will generally trigger the over-current protection (OCP) and the switching frequency will be made to increase to limit the stress before decreasing smoothly to a steady state operating point to complete the start-up process. If the switching frequency is controlled to decrease slowly, the soft start-up process will be similarly prolonged.

SUMMARY OF THE INVENTION

It is therefore an object of the present invention to provide a methodology and apparatus for optimally controlling the start-up process for a resonant power converter.

It is another object of the invention to provide a technique and methodology for determining an optimal start-up process for any of a wide variety of requirements of devices for which a resonant power converter may be desired.

It is another object of the invention to provide for optimal switching frequency to be utilized during soft start-up of a resonant power converter.

In order to accomplish these and other objects of the invention, a method of operating a switching resonant power converter comprising steps of setting a current limitation band, monitoring resonant inductor current, controlling switching when monitored inductor current equals limits of the current limitation band until bias on a resonant capacitor reaches a steady state voltage, and allowing the power converter to assume a steady state mode of operation in accordance with build-up of output voltage.

In accordance with another aspect of the invention, a resonant power converter is provided including a resonant circuit, a switching circuit to connect and disconnect a power source and the resonant circuit, a current monitoring circuit to monitor current in the resonant circuit, and a control for determining switching times of the switching circuit when current in the resonant circuit coincides with upper and lower current limits of a current limitation band.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
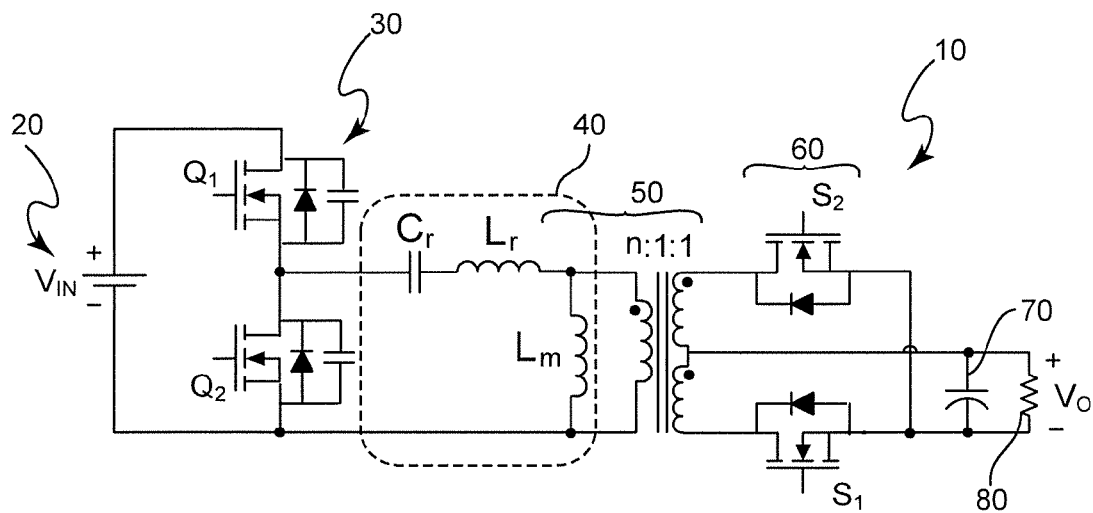
FIG. 1 is a schematic diagram of an LLC resonant power converter.

Referring now to the drawings, and more particularly to FIG. 1, there is shown a schematic diagram of a resonant power converter 10 representative of resonant converter topologies to which the invention is directed. This schematic diagram is simplified and generalized to convey an understanding of the invention and no portion of FIG. 1 is admitted to be prior art in regard to the present invention. It should also be understood that, while FIG. 1 illustrates a half bridge LLC resonant power converter, the invention is not limited to power converters having that particular topology (e.g. full bridge switching can be used and is preferred for some embodiments and applications as will be described in greater detail below) or power converters including a resonant LLC tank circuit but is applicable to any resonant power converter of any topology and any resonant circuit configuration.

The power converter illustrated in FIG. 1 includes a DC power source 20 such as a battery or input from a rectifier circuit, a pair of switches 30 comprising switches Q1 and Q2, a resonant tank circuit 40, a transformer 50 having a center-tapped secondary, a pair of synchronous rectifier switches 60 comprising switches S1 and S2 and a filter capacitor 70. An arbitrary load 80 is also illustrated for reference.

At start-up and during steady state operation, Q1 and Q2 will be driven to conduct in an alternating and complementary fashion; Q1 connecting and disconnecting the power converter to input power and Q2 supplying so-called freewheel current to the resonant tank circuit 40 when the input power is disconnected by Q1. The resonant tank circuit, when operated at the resonant frequency, continually transfers energy back and forth between the resonant capacitor, $C_r$, and the resonant inductor $L_r$, which, depending on the condition or voltage/current state of the resonant tank circuit as will be discussed in greater detail below, may also include the magnetizing inductance $L_m$ of the transformer 50.

Figure 2:
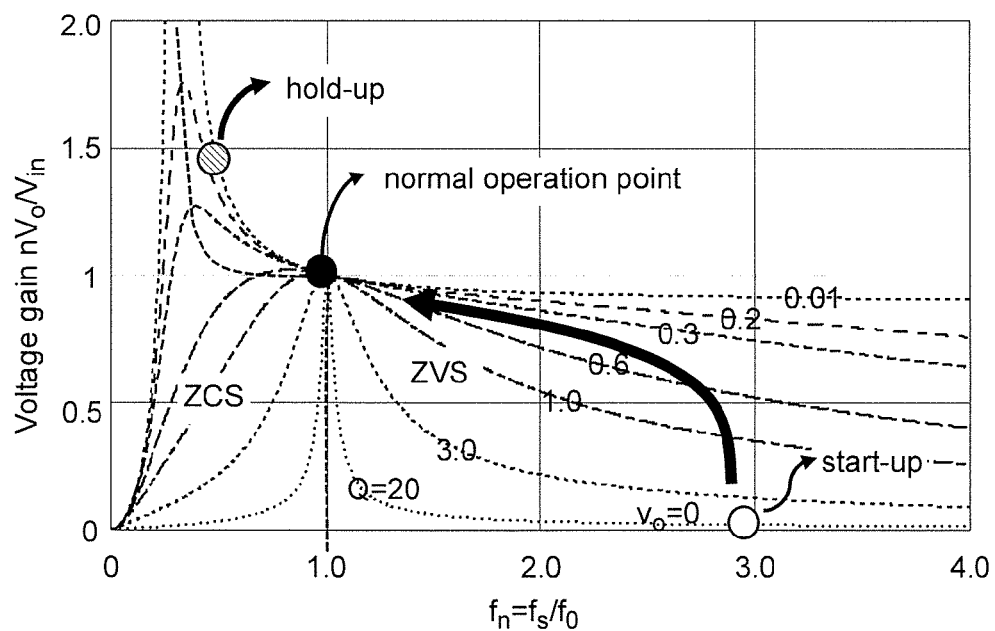
FIG. 2 is a graph of the DC voltage characteristic of the LLC converter of FIG. 1.

The DC characteristic of this resonant power converter is illustrated in FIG. 2, showing gain of the converter as a function of frequency normalized to the resonant frequency of the power converter. It can be seen that the gain is equal to 1 at the resonant frequency; diminishing at higher frequencies and increasing at lower frequencies. When operated at frequencies below the resonant frequency, the output voltage is greater than the input voltage and such a mode of operation is referred to as a hold-up mode which is particularly useful for extracting additional power from batteries as they are discharged and the voltage available therefrom is reduced. It should be noted that the region corresponding to frequencies below the resonant frequency allows zero current switching (ZCS) while frequencies above the resonant frequency allow zero voltage switching (ZVS).

In zero current switching (ZCS) region of operation below the resonant frequency at start-up, when Q1 turns off, current can still pass through the paralleled diode in Q1. Therefore, when Q2 turn on, the power input is shorted and produces large current and voltage stress which may be large enough to destroy the switching devices. In other words, in the state trajectory diagram of FIG. 8, the switching points would be in the second and fourth quadrants rather than the first and third quadrants. In contrast, if start-up is conducted in the zero voltage switching (ZVS) region, when Q1 turns off, the current will still go through the paralleled diode and the voltage across Q2 become zero before Q2 turns on. Thus ZVS provides lossless switching for Q2.

Under soft start-up conditions, the output voltage $V_O$ must be built up from zero to the steady-state value to avoid the operational mode of the converter from entering the ZCS zone. Therefore, the switching frequency at start-up should be above the resonant frequency and then diminish to approximately the resonant frequency along a path as generally illustrated by a curved arrow in FIG. 2. It will be helpful to obtaining an understanding of and appreciation for the invention in the following discussion to recognize that the particular starting point and shape of this curved arrow is important to avoid excessive current and voltage stress in the resonant converter during start-up. However, the frequency starting point, rate and rate of change that will avoid excessive electrical stress consistent with good performance (e.g. rapid settling to steady state operation) is difficult to determine. To solve this trade-off between electrical stress and start-up speed, the invention provides for optimization thereof and optimized control of start-up for particular design and performance requirements of the power converter.

Figure 3:
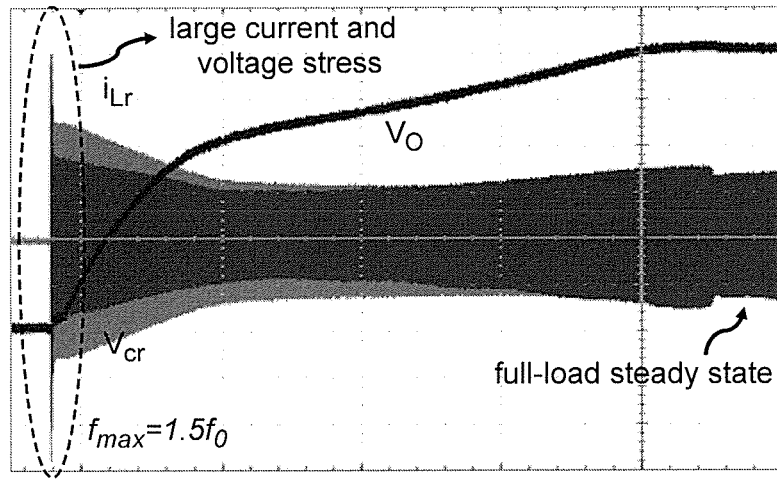
FIG. 3 is a graph of voltage and current levels during soft start-up of the LLC converter of FIG. 1, using a low switching frequency.

As alluded to above, current and voltage at start-up of an LLC resonant converter at low switching frequency (e.g. above the resonant frequency but less than 1.5 times the resonant frequency) are plotted as a function of time in FIG. 3. (In FIG. 3, the voltages and current traces are overlaid in view of the size of the initial spikes. That is, the vertical location for a zero value is different for each curve for each curve.) A very large current and voltage spike occurs at the initial switching instant and for a few switching cycles thereafter since the initial output voltage is zero and builds up slowly as can be seen from the $V_O$ curve included in FIG. 3. After the initial spikes and as the output voltage builds up, the current and voltage diminish somewhat slowly to near the steady state levels before again rising slightly due to dynamic oscillation and then again dropping slightly but more abruptly as steady state conditions are met and $V_O$ becomes stable.

Figure 4:
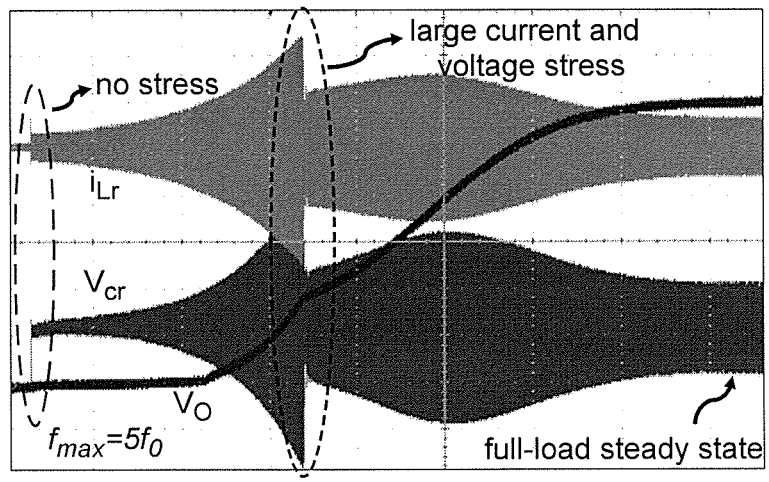
FIG. 4 is a graph of voltage and current levels during soft start-up of the LLC converter of FIG. 1, using a high but rapidly decreasing switching frequency.

Conversely, as shown in FIG. 4, if an excessively high switching frequency is used at start-up, there is no excessive initial electrical stress but if the frequency is reduced toward the resonant frequency too quickly before $V_O$ is reached (which will also occur more slowly than in the case of FIG. 3) the electrical stress levels rise quickly which may trigger over-current arrangements and increase the switching frequency to reduce the electrical stress. Then the electrical stress will again increase before settling smoothly to steady state conditions.

Figure 5:
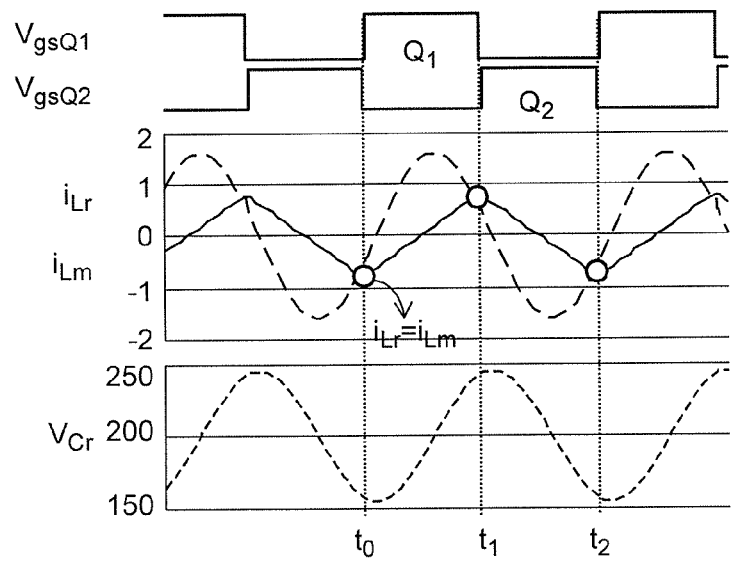
FIG. 5 is a graph of steady state waveforms in the LLC resonant power converter of FIG. 1.
Figure 6:
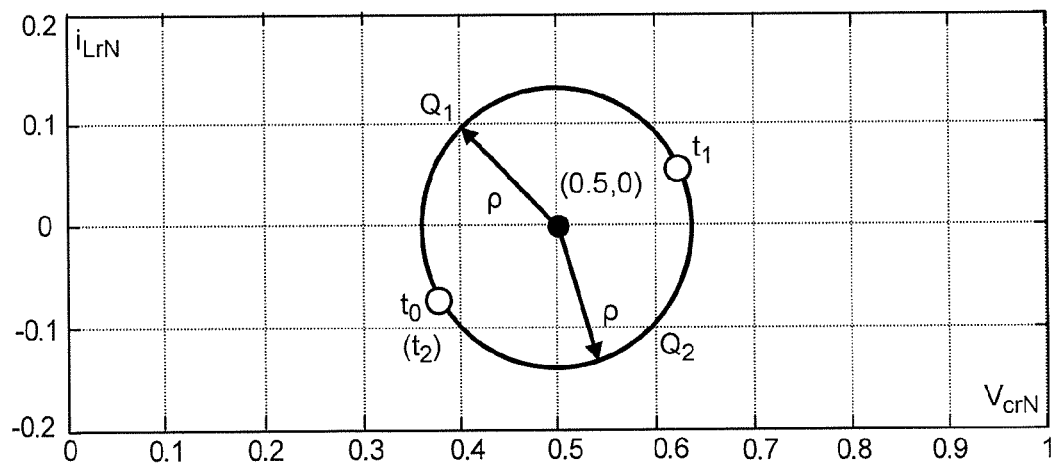
FIG. 6 is a state trajectory diagram for the steady state operation of the LLC resonant power converter of FIG. 1, FIG. 7 schematically illustrates the equivalent circuits of FIG. 1 during switching periods at resonant converter start-up.

State trajectory analysis is a recently developed graphic technique for analyzing transient and steady-state behaviors of resonant circuits. As such, they are also useful in designing controls for circuits connected to such resonant circuits. Essentially, a state trajectory diagram is a plot of resonant capacitor voltage against resonant inductor current as shown in FIGS. 5 and 6. FIG. 5 illustrates time domain steady state waveforms applied to Q1 and Q2 of the circuit of FIG. 1 and the resulting resonant capacitor voltage waveform and current waveforms in the resonant inductor and magnetizing inductances under steady-state conditions and with the switching frequency equal to the resonant frequency. The resonant capacitor will be operating with a voltage bias equal to approximately one-half of the input voltage and, as alluded to above, at resonance, energy will be exchanged between the resonant capacitor and the resonant inductor in a substantially sinusoidal manner with a 90° phase difference between current and voltage. The waveform of the current in the magnetizing inductance is substantially triangular under steady state conditions and will be equal to the resonant current at the switching points of Q1 and Q2.

If these periodic, steady-state waveforms are normalized (as indicated by "N" in subscripts) and plotted against each other as shown in FIG. 6 they will form a circle centered at the bias voltage of the resonant capacitor and average inductor current of zero (coordinates (0.5, 0)) much as would be produced as a Lissajous pattern on an oscilloscope. The radius, ρ, of the circle is a function of the normalized voltage and current swings. The switching points are shown at $t_0$ ($t_2$) (so notated since the pattern is being repeatedly traversed such that $t_2$ will have the same voltage and current state as $t_0$) and $t_1$. These points are at non-zero currents since current is required to charge and discharge the junction capacitances of Q1 and Q2, causing a slight notch in the circular locus that will be seen in other, less idealized state trajectory diagrams. Therefore the circular pattern of FIG. 6 is actually formed of two semi-circular portions corresponding to conduction times of Q1 and Q2, respectively. (For this reason, use of S1 and S2 as synchronous rectifiers is preferred over diode so that their switching times can be slightly shifted in phase from those of Q1 and Q2 to match the polarity of the voltages and currents produced on and is the center tapped secondary winding of transformer 50.)

It follows from the above description of how the pattern of FIG. 6 is derived and the fact that the waveforms are periodic, that the pattern will be traversed by instantaneous values of current and voltage at the resonant angular frequency and, therefore, state trajectory analysis can also provide time durations for traversal of any portion of the pattern. That is, for normalized voltage and currents in a resonant circuit, all trajectories, whether steady state or transient will be circular arcs and periods of time can be quantitatively determined or constructed from the angular frequency and the angle subtended by each arc or portion thereof and vice-versa. Further, while not all arcs for a particular normalization factor will be circular but could be elliptical, any arcuate trajectory can be normalized in regard to the current and voltage represented to be made a circular arc to which a geometric analysis can be quantitatively applied.

Figure 7:
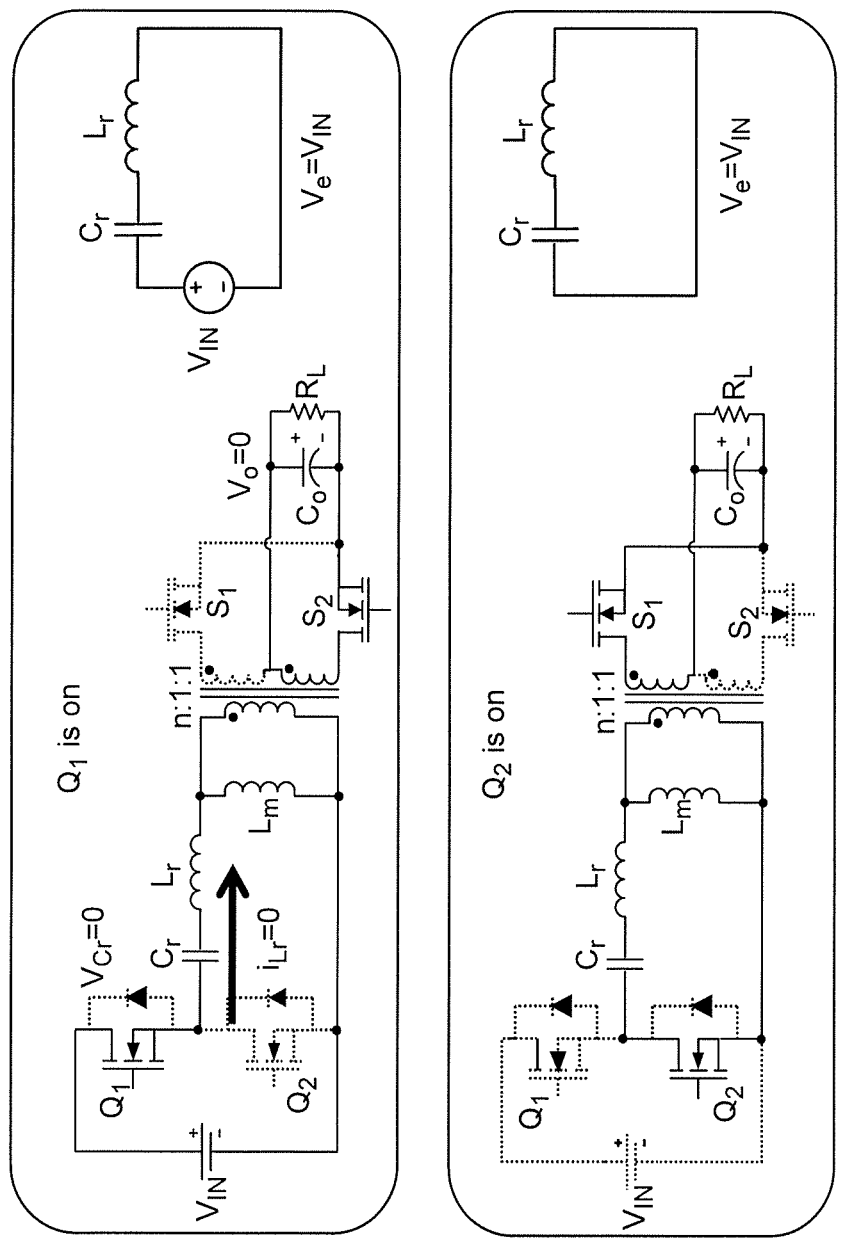
Figure 8:
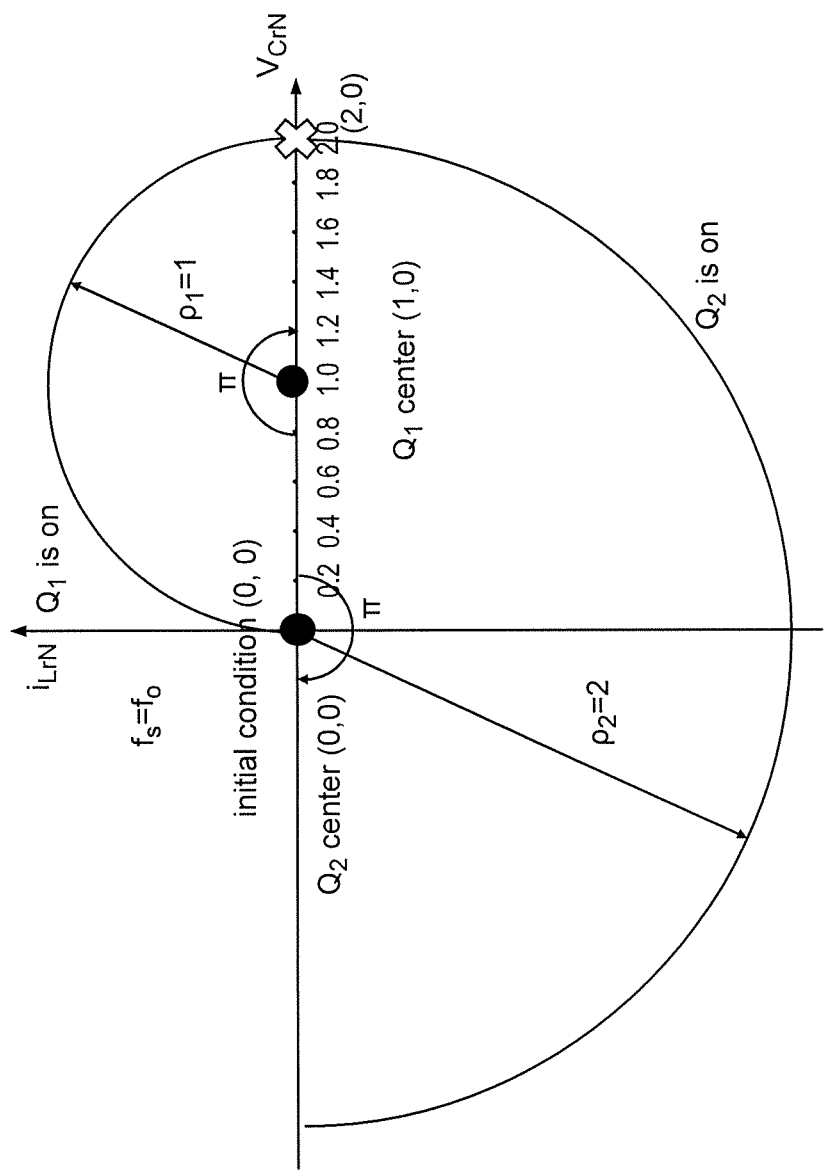
FIG. 8 is a state trajectory diagram illustrating the voltage/current trajectory of the LLC resonant power converter of FIG. 1 during start-up fi the switching frequency equals the resonant frequency.

Referring now to FIGS. 7 and 8 and with the above discussion of state trajectory analysis, the development of large electrical stresses at start-up of resonant power converters will now be explained. FIG. 7 shows the equivalent circuits of FIG. 1 during conduction periods of Q1 and Q2 respectively. As indicated in FIG. 7, one equivalent circuit is connected to power source 20 and one is not. Assuming that the upper equivalent circuit occurs first (because initially connecting the power converter to zero volts would be trivial and would not initiate start-up), the initial conditions shown in the state trajectory diagram of FIG. 8 are that the voltage across the resonant circuit is $V_{in}$ (normalized to coordinates (1.0)) as the center of the first trajectory which begins at coordinates (0,0) since no voltage is applied to the power converter prior to Q1 initially turning on. Since it is assumed for purposes of discussion of FIG. 8 that the switching frequency is equal to the resonant frequency (e.g. $f_s=f_0$) the first trajectory will be a half circle ending at coordinates (2,0). When Q1 is switched off and Q2 is switched on, the voltage across the resonant circuit is again substantially coordinates (0,0) since no significant current would have been conducted to charge the resonant capacitor. Therefore, the second trajectory is a half-circle centered at (0,0) and beginning at (2,0) thus doubling the radius, $\rho_2=2\rho_1$. This process continues with the third trajectory again being centered at coordinates (1,0) and beginning at (2,0), producing a radius ρ=3 (less any voltage, $V_O$, built up on the resonant capacitor which initially will be negligible), and so on, resulting in half circles of increasing radius until limited by increasing $V_O$. Thus large electrical stresses are developed at start-up of resonant power converters which can cause damage to or destruction of electrical elements of the power converter unless those elements are grossly over-designed to tolerate electrical stresses far in excess of those that will be present during steady state operation. Protection circuits could, in theory, be provided but the nature of any such circuits and the effects on the start-up behavior of a resonant power converter are difficult to predict and are likely to adversely affect start-up performance as noted above in regard to starting frequency and rate of frequency change and would add substantially to the cost of the resonant power converter. In any case, a circuit designed for protection against electrical stress would not be expected to enhance power converter start-up performance, as well, as is provided by the invention.

In accordance with the invention, a current limitation band is set. As will be observed from the following discussion, the current limitation band also serves to limit voltage. It should be understood that the current limitation band is a design constraint or parameter and not a physical circuit that performs such current limitation by current diversion or power converter control or the like but, rather, is simply a limit on the permitted current excursion which can be achieved by a simple circuit for controlling the switching instants of Q1 and Q2 at the currents to which the current limitation band is set. Therefore, the first consideration in design of the current limitation band is the magnitude of the limits to place on the current, (e.g. $-I_{MAX}$ and $+I_{MAX}$).

Figure 9:
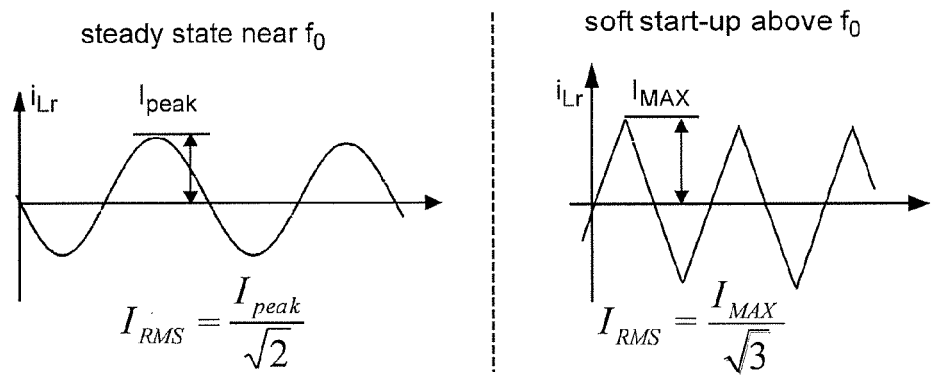
FIG. 9 illustrates steady state and start-up waveforms of inductor current of the LLC power converter of FIG. 1 during start-up.

To determine appropriate current limit values, FIG. 9 illustrates a comparison of the steady state resonant inductor current waveform near $f_0$ and the resonant inductor current waveform during start-up at a frequency above $f_0$. As alluded to above, the steady state waveform is substantially sinusoidal. However, depending on the frequency, the start-up waveform will be substantially triangular. To guarantee that the LLC (or other resonant circuit) is operating in a safe zone and to minimize losses, the same RMS value of both the sinusoidal waveform and the triangular waveform is desirable. When the current limit is set in such a manner, no electrical stress beyond the design capacity of the power converter at steady-state conditions can occur. Therefore, the current limitation band can preferably be set at $$I_{MAX} = ((3)^{1/2}/(2)^{1/2})I_{peak}$$

where $I_{peak}$ is the peak amplitude of the sinusoidal waveform under full load, steady state conditions.

Figure 10:
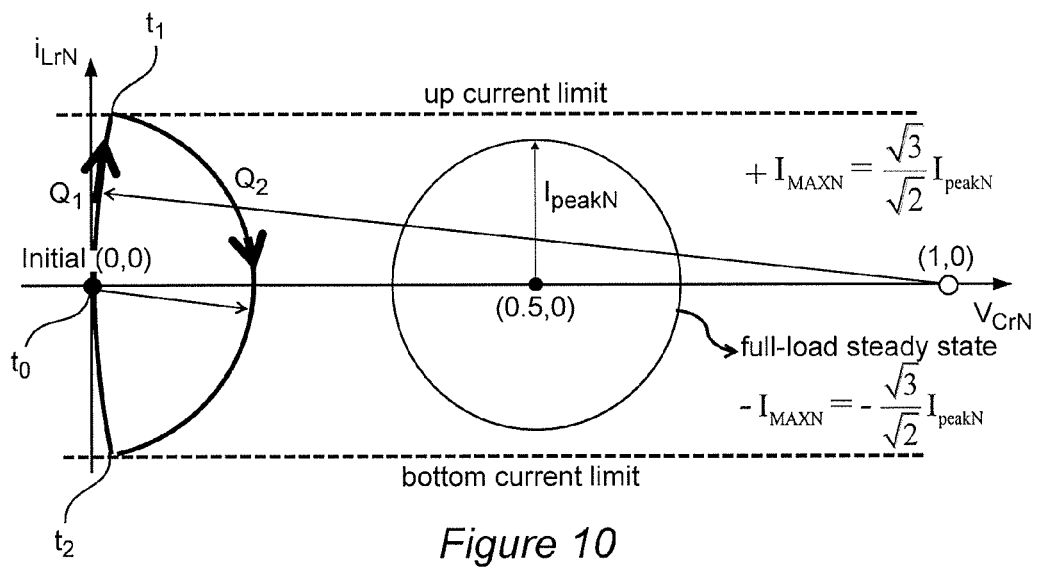
FIG. 10 is a state trajectory diagram of start-up of the LLC power converter at start-up within a symmetrical current limiting band.

FIG. 10 shows a state trajectory diagram with a current limitation band superimposed thereon. It will be recognized from a comparison with FIG. 8 that the initial trajectory is started at coordinates (0,0) at $t_0$ as described above but is terminated at the current limit $I_{max}$. As before, the second trajectory will begin at the end point of the first trajectory and the center is at (0,0) but, in this case, the voltage is small and the current is at the limit of the current band. Therefore, by symmetry, between $t_1$ and $t_2$, the second trajectory will cause the voltage to increase and decrease while the current falls to the lower current limit. The third trajectory returns to the initial point and continues to the upper current limit, during which a small (initially negligible) amount of current is delivered to the resonant capacitor to start the build up of $V_0$. While voltage on the resonant capacitor is still negligible, the state variables are fixed to the two partial circle trajectories shown in FIG. 10 which are still far away from the steady state circular trajectory.

Figure 11:
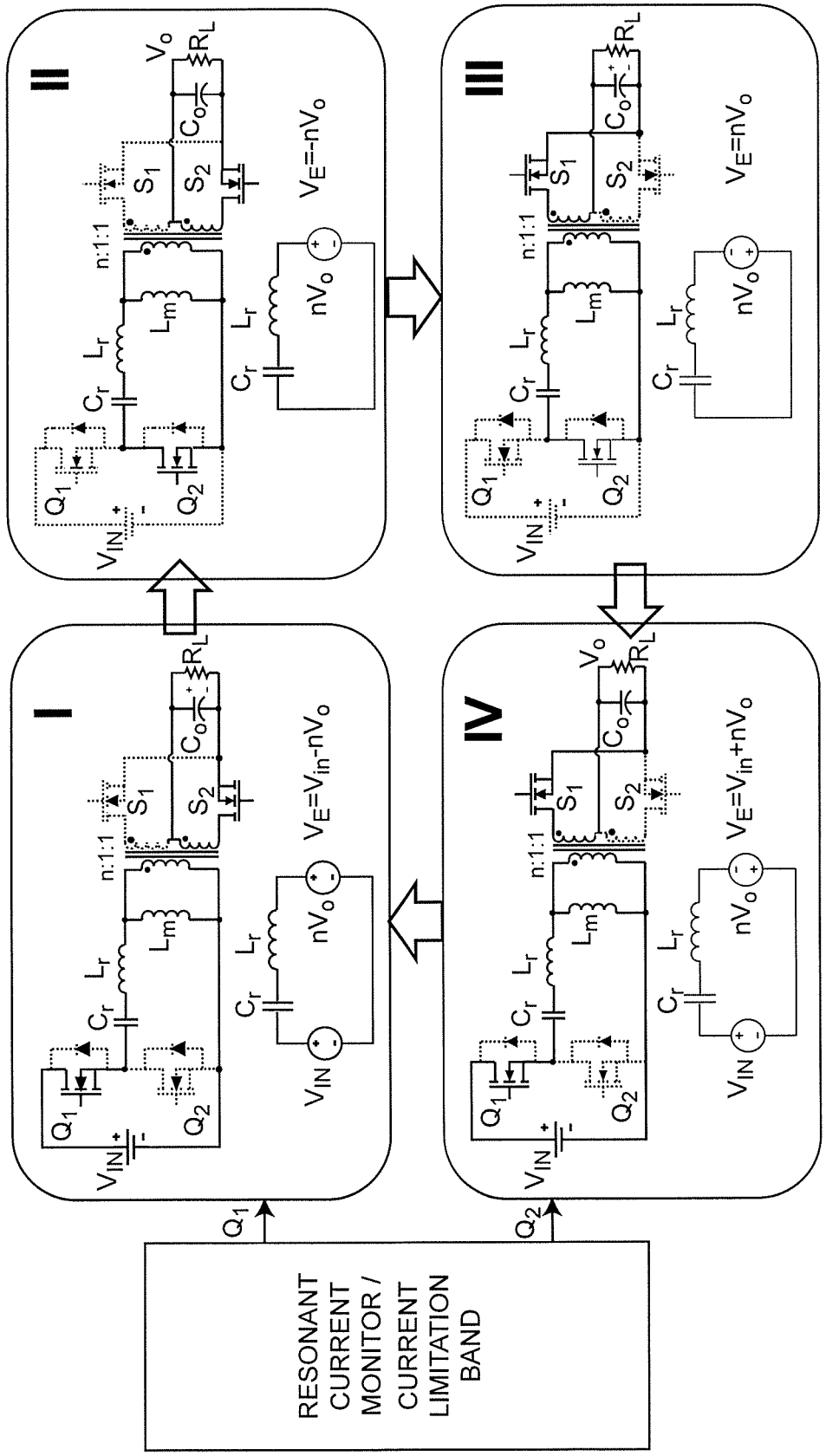
FIG. 11 illustrates equivalent circuits of the LLC power converter circuit of FIG. 1 in four operational modes during start-up.
Figure 12:
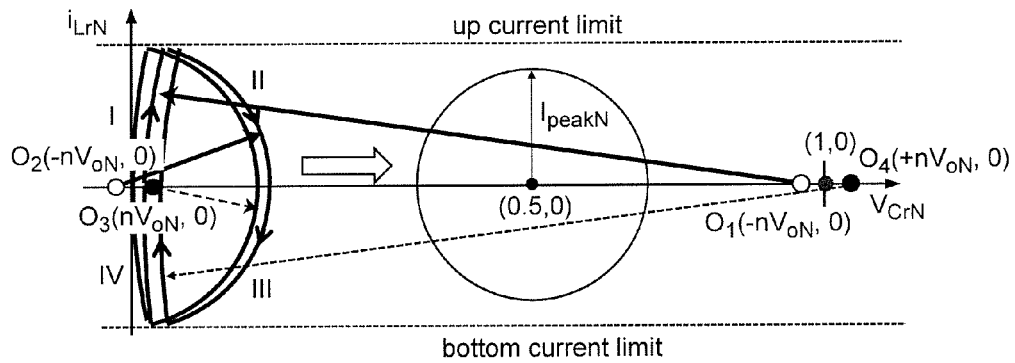
FIG. 12 illustrates trajectory movement as $V_O$ increases during start-up, FIG. 13 graphically illustrates time-domain waveforms during settling of initial conditions during start-up.
Figure 13:
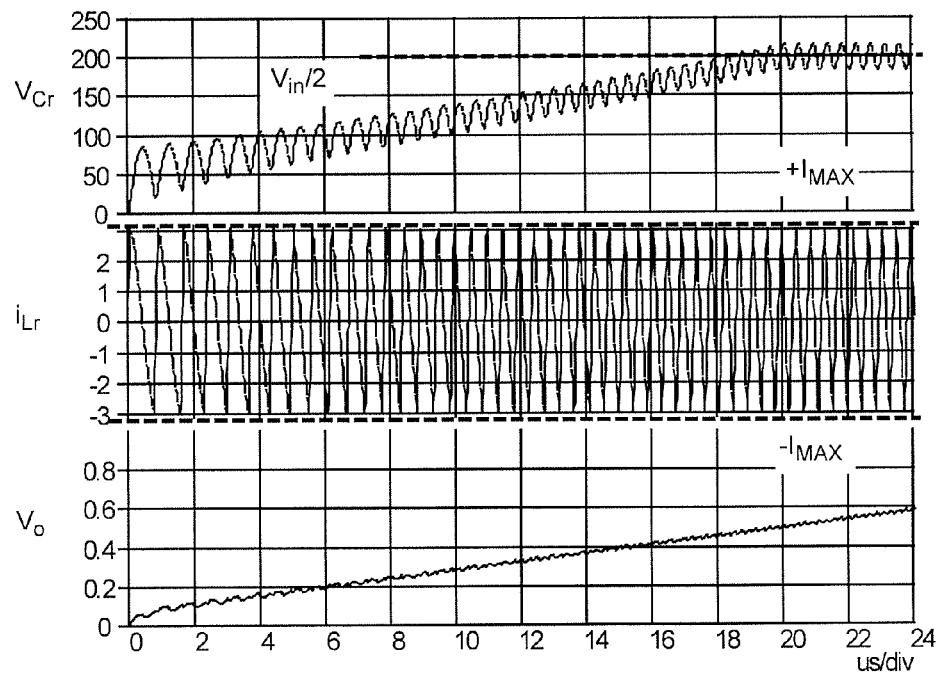

When the output voltage and resonant capacitor voltage are no longer negligible, the two operational modes become four distinct operational modes; the equivalent circuits for which are illustrated in FIG. 11 in which $V_E$ is the voltage across the resonant tank and, after normalization by $V_{in}$, becomes the center of the trajectories. In terms of the state diagram, the original centers of the two respective trajectories each split into two separate trajectory centers $(-V_{ON}, 0), (V_{ON}), (1-V_{ON}, 0)$ and $(1-V_{ON}, 0)$ as shown in FIG. 12. Therefore, the overall trajectory shape changes very slightly and shifts toward the steady state circle. FIG. 13 illustrates the corresponding time domain waveforms.

Figure 14:
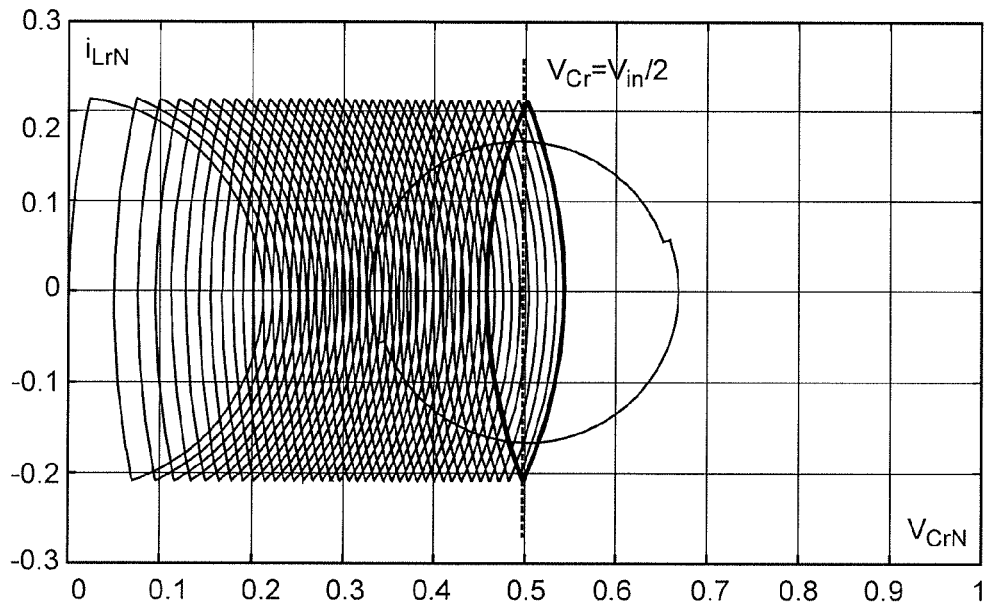
FIG. 14 illustrates state trajectory movement during settling of initial conditions during start-up.
Figure 16:
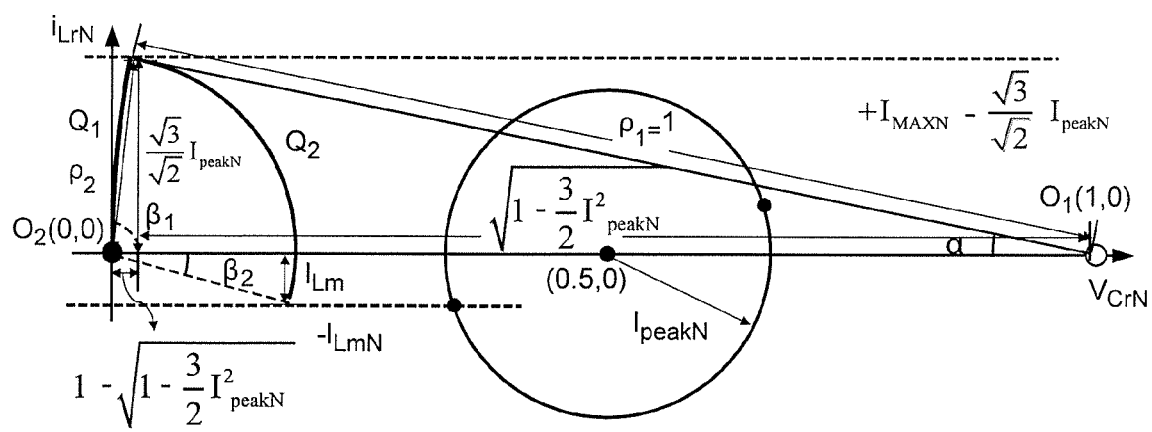
FIG. 16 illustrates calculation of optimal pulse widths to produce rapid settling in FIG. 16.

It should be noted from FIG. 13 that the voltage bias on the resonant capacitor is built up to the steady-state bias voltage well before the output voltage, $V_0$, has reached its steady state value. It should also be noted that the frequency of these waveforms is increasing somewhat with increasing $V_0$. The reason is that as the overall trajectory pattern reaches the steady state, the angles about the respective centers subtended by the respective portions of the trajectory are changing and thus the time required for the voltage/current state to traverse each trajectory portion is also altered with some becoming longer and others shorter for a net decrease in time between switching instants which are controlled during start-up in accordance with the invention by the monitored current reaching limits of the current limitation band while the angular velocity or frequency, $\omega_0$, remains that of the resonant circuit. This change may be visualized as a result of the change in shape of the overall trajectory as it approaches the location of the steady state circle as shown in FIG. 14. When the resonant capacitor has been charged to its steady-state bias, the center of the initial trajectories will be be same as that of the steady-state circle.

Thus, the soft start-up of the resonant converter occurs in two stages: an initial stage as the resonant capacitor is charged to its steady-state bias (where the state trajectories form a narrow but symmetrical pattern, which may be referred to as a full bias trajectory and a subsequent stage as the output voltage is built up and the state trajectories settle into a steady-state substantially circular pattern. The transformation of the overall trajectory shape to that of the steady state circle will be discussed below since it is shared in common with other embodiments of the invention as will now be discussed.

It is also evident from FIG. 14 that a large number of repetitions of the trajectory sequence of FIGS. 11 and 12 is required to build up $V_0$ and to develop the resonant capacitor bias to $V_{in}/2$. However, electrical stress is substantially eliminated. Therefore, this embodiment may be preferable where a somewhat extended start-up time (which is still much reduced from the start-up time required in the absence of the invention) is tolerable.

In order to reduce the number of cycles of the trajectory sequence, an asymmetrical current limitation band can be used in accordance with a second embodiment of the invention. Such an asymmetrical current limitation band is illustrated superimposed on a steady state circle in the state trajectory diagram of FIG. 15. Returning briefly to FIGS. 5 and 6, it was noted above that the switching instants occur at a non-zero current. A short interval, referred to as dead-time is provided between the turn-off time of one of Q1 and Q2 and the turn-on time of the other to prevent shorting the input power. The interval also allows achievement of ZVS by applying the current in the magnetizing inductance, $i_{Lm}$, to charge and discharge the junction capacitances of the switches. To maintain the same dead-time interval, the lower current limit for the asymmetrical current limitation band is set to be the same as the as the instantaneous current at the switching instant under steady state conditions in order to achieve ZVS in this case (e.g. $I_{LrN} = I_{LmN}$, where the resonant current equals the magnetizing current of the transformer). The upper current limit is set as described above.

Figure 15:
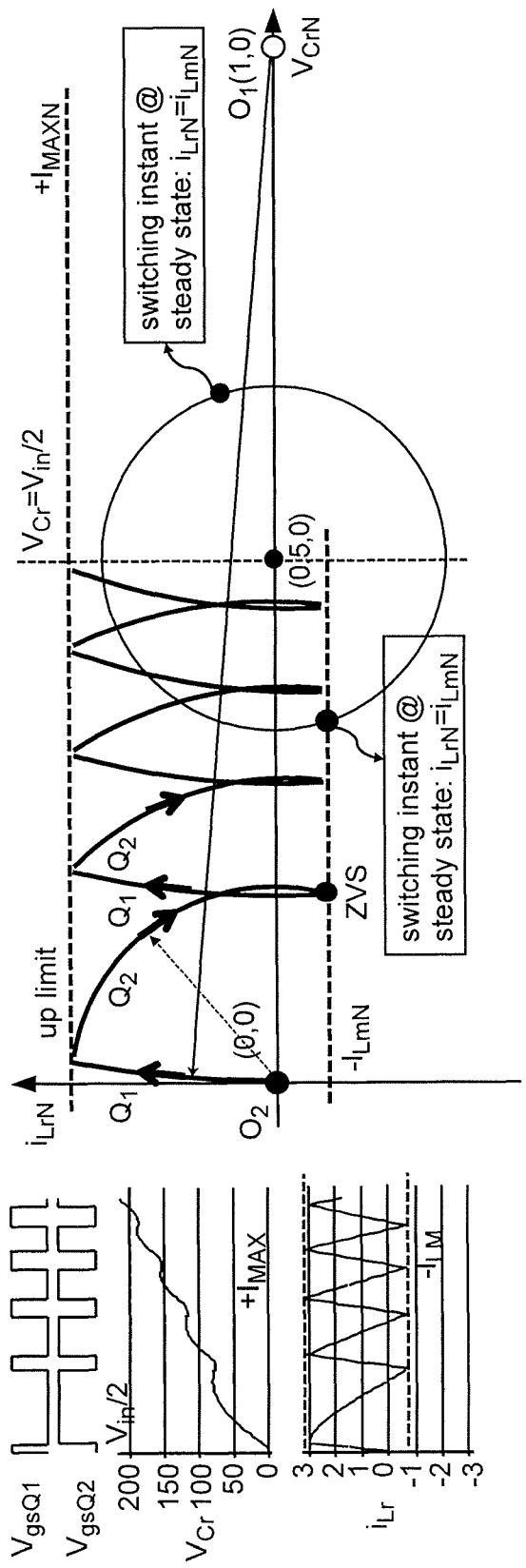
FIG. 15 illustrates waveforms and state trajectory during start-up within an asymmetrical current limiting band.

The first trajectory is traversed as in the symmetrical current limitation band embodiment. The second trajectory also begins in the same manner as described above and terminates at the lower current limit. However, since the lower current limit has been changed, the second trajectory is terminated earlier at a higher voltage, providing substantial charge to the resonant capacitor or, perhaps more accurately, reducing the discharge of the resonant capacitor. That is, using an asymmetrical current limitation band, the capacitor is not discharged to the degree discharge occurs with symmetrical current limits. The corresponding time domain waveforms are also shown in FIG. 15.

Therefore $V_{Cr}$ can be built up in much larger steps, requiring fewer cycles of the switching sequence. The time required for build-up of $V_{Cr}$ is also reduced by the fact that the even numbered trajectories subtend a smaller angle around their center and thus are of shorter duration. The optimal pulse durations can be derived as discussed in "Optimal Trajectory Control of LLC Resonant converters for soft Start-Up by Weiyi Feng et al. electronically published on the IEEE website on May 1, 2013, with hard copy publication in IEEE Transactions on Power Electronics, Volume 29, Issue 3, pp. 1461-1494, scheduled for March, 2014 which is hereby fully incorporated by reference. However, if switching times are determined by current comparison, the optimal pulse durations need not be rigorously determined or replicated in circuitry. However, it is important to note that, as in the symmetrical current limitation band embodiment, the angles about the individual trajectory centers will change and the optimal pulse durations will thus also change and, if computed, must be computed on a step-by-step basis.

Figure 17:
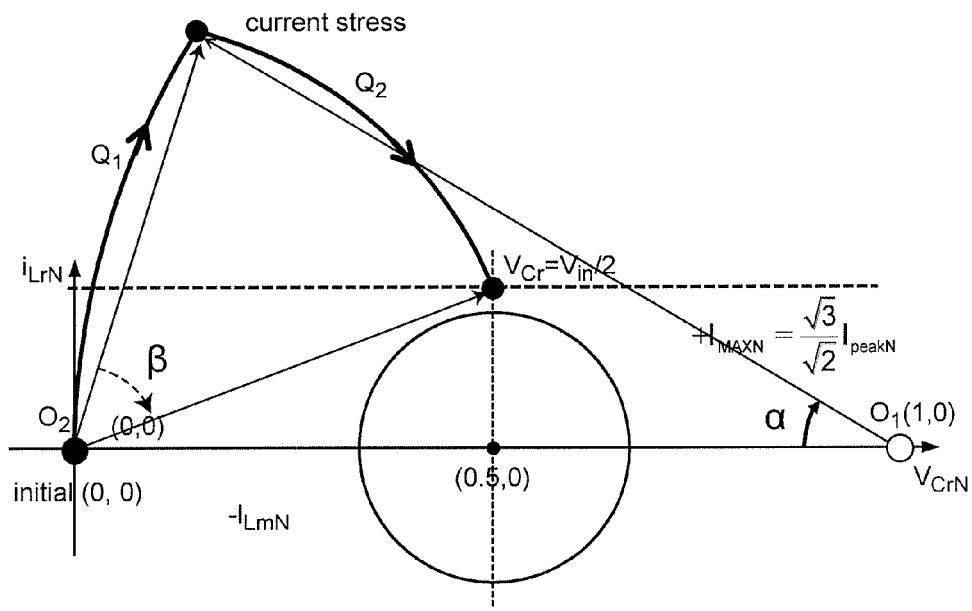
FIG. 17 is a state trajectory diagram illustrating a trajectory for settling to a steady state trajectory within a single switching cycle.

It should also be appreciated that while the second embodiment provides a much shorter start-up process duration than the first embodiment, it is not optimally fast in doing so as can, in fact, be achieved by the third embodiment of the invention as will now be described in connection with FIG. 17. Specifically a so-called "one-cycle" settling time can be achieved in accordance with the invention that still reduces electrical stress far below the electrical stress that would otherwise occur and which only exceeds the electrical stress achieved by the first two embodiments by a relatively small factor. In actuality, the settling time is less than that of one switching cycle at the resonant frequency since the two trajectory segments subtend angles α and β which total less than 360°. However, the one-cycle nomenclature is a correct reference to one switching cycle of Q1 and Q2. As shown in FIG. 17, by extending the Q1 switching period (or allowing the current limitation band to be exceeded for the first switching period of Q1) such that the resonant inductor current is allowed to rise well above the steady state but substantially less than the current increase noted above in connection with the discussion of FIG. 6, the Q2 switching period which reduces inductor current but also delivers charge to the resonant capacitor may be made to reduce the inductor current to the level of the preferred upper current limit at a time that coincides with the instant that the resonant capacitor voltage reaches $V_{in}/2$. The pulse durations to achieve this condition are similar to those for the second embodiment that are set out in detail in the above-incorporated article.

Figure 17A:
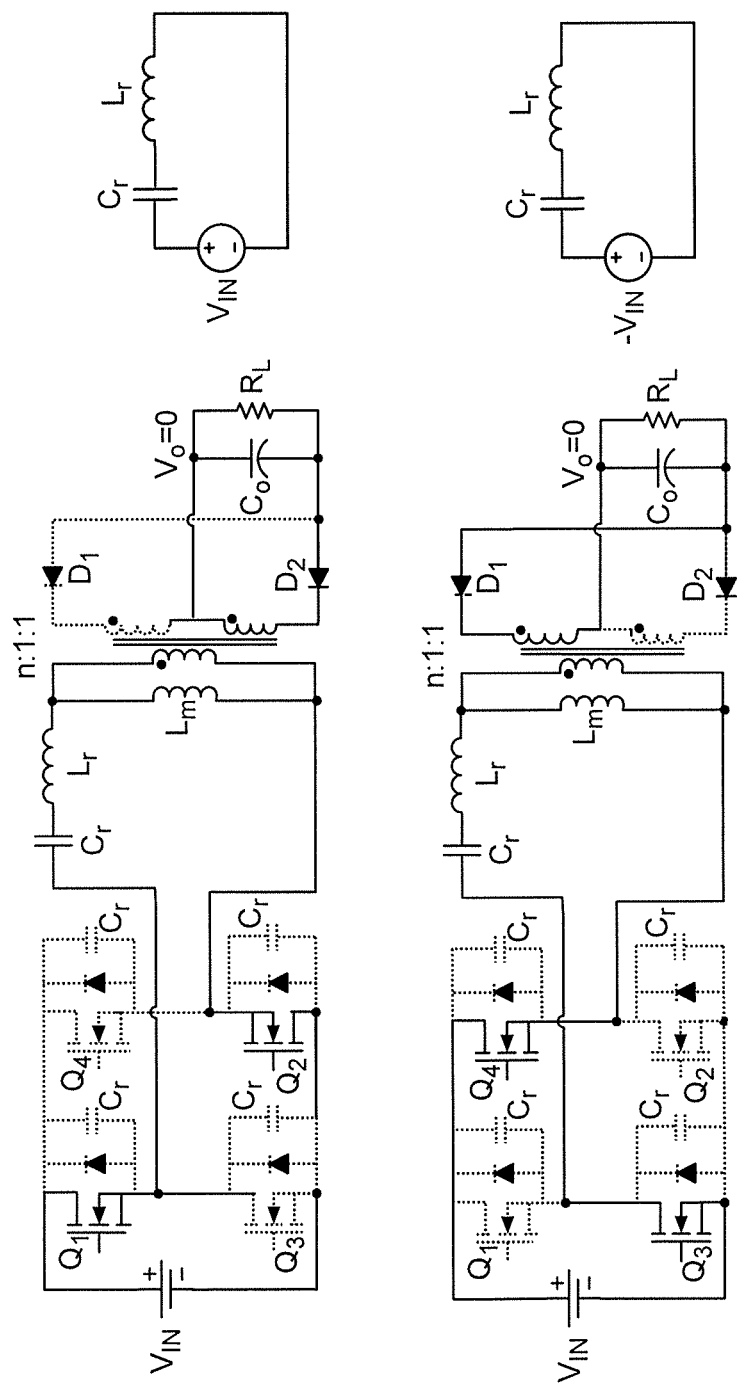
FIGS. 17A, 17B and 17C illustrate an alternative method of settling to steady state operation within one full-bridge switching cycle.
Figure 17B:
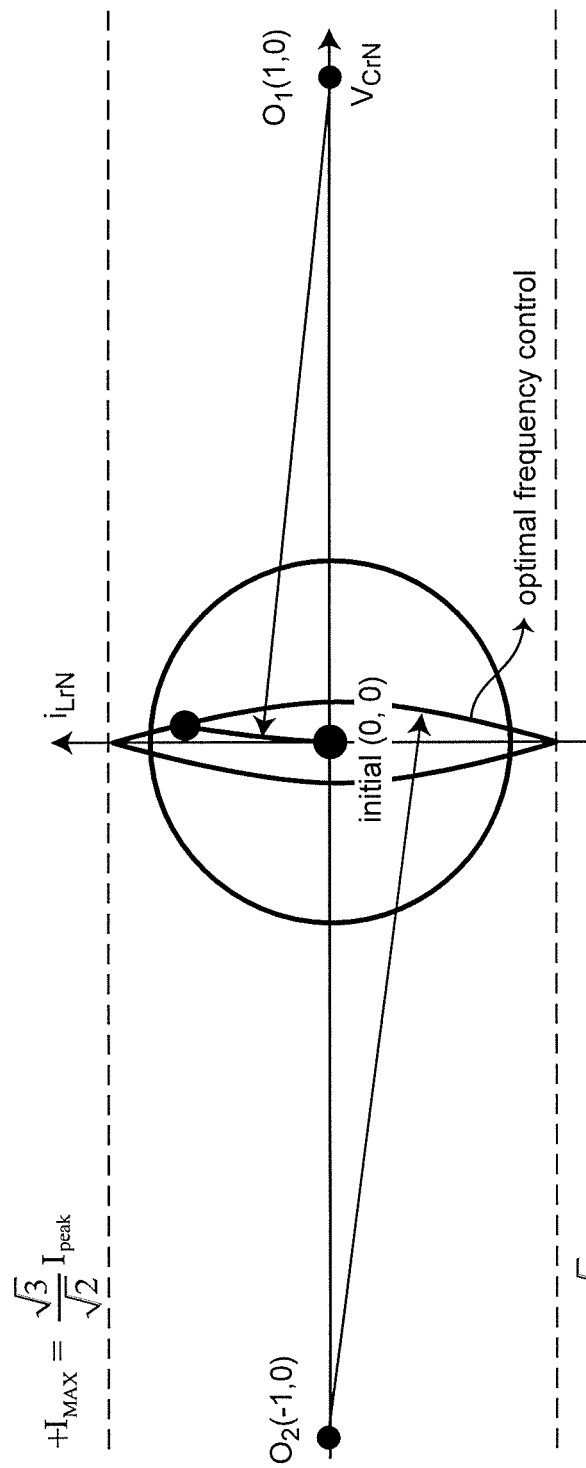
Figure 17C:
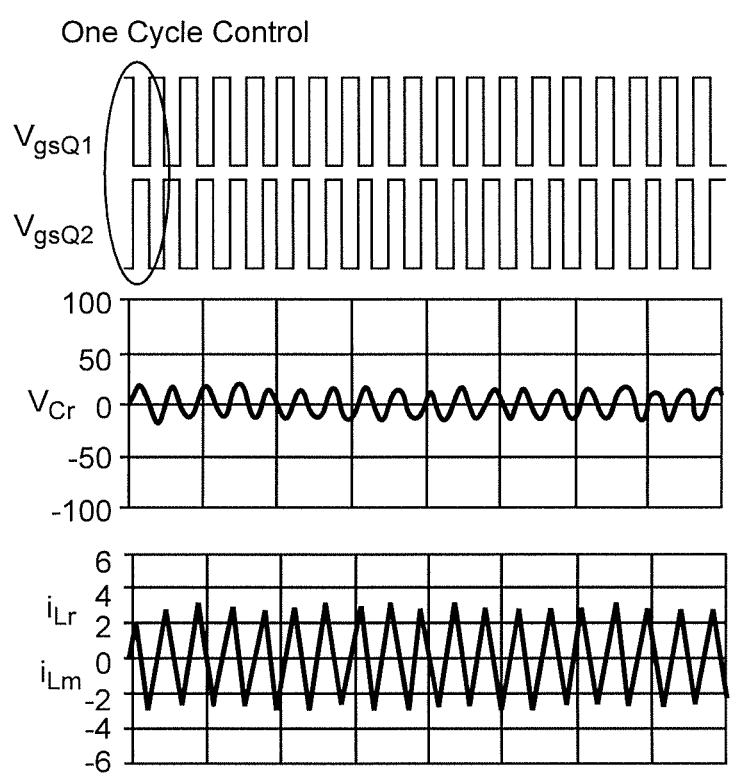

While the embodiments of the invention discussed above have been explained in terms of a half bridge switching circuit, soft start-up can also be achieved in much the same manner and optimized using an analysis similar to that described above. However, use of a full bridge switching circuit presents different initial conditions that can be exploited to provide even faster settling to full load, steady-state operation with no electrical stress. Specifically, with a full bridge switching circuit as shown in FIG. 17A, no charge (e.g. zero steady state bias voltage) is required on the resonant capacitor and the full load steady-state trajectory will be a circle centered at (0,0) as shown in FIG. 17B. Time domain waveforms are shown in FIG. 17C. Applying a graphical analysis similar to that described above, it is seen that a shortened initial Q1, Q2 pulse can cause the first trajectory to terminate on a trajectory similar to those discussed above when voltage has been built up on the resonant capacitor (e.g. the full bias trajectory) and corresponds to build up of output voltage in the case of a half-bridge switching circuit and which will settle into the circular full load steady-state trajectory as will be described below. It should be noted that the initial Q3, Q4 pulse will also be shortened. Therefore, use of a full bridge switching circuit can achieve soft start-up and settle to full load steady-state operation extremely quickly. The length of these initial pulses to achieve such an effect can be computed or approximated as discussed above based on the angle subtended by the respective circular arcs referenced to the angular frequency of the switching cycles. Again, the appropriate duration of these pulses need not be exact since some overshoot or undershoot is tolerable and results in some degree of dynamic oscillation which is relatively minor and can be quickly damped. The shortening of initial pulses can be achieved with a simple resistor-capacitor (RC) circuit in combination with a very simple latch or other logic circuit to disable the RC circuit after the first pulse. The duration of the initial pulses can also be based on controlling switching instants at a reduced current limit for the first pulse or based on the resonant capacitor voltage reaching one half of its peak voltage. Other simple circuits such as a delay circuit for shortening the initial switching periods will be apparent to those skilled in the art.

Figure 18:
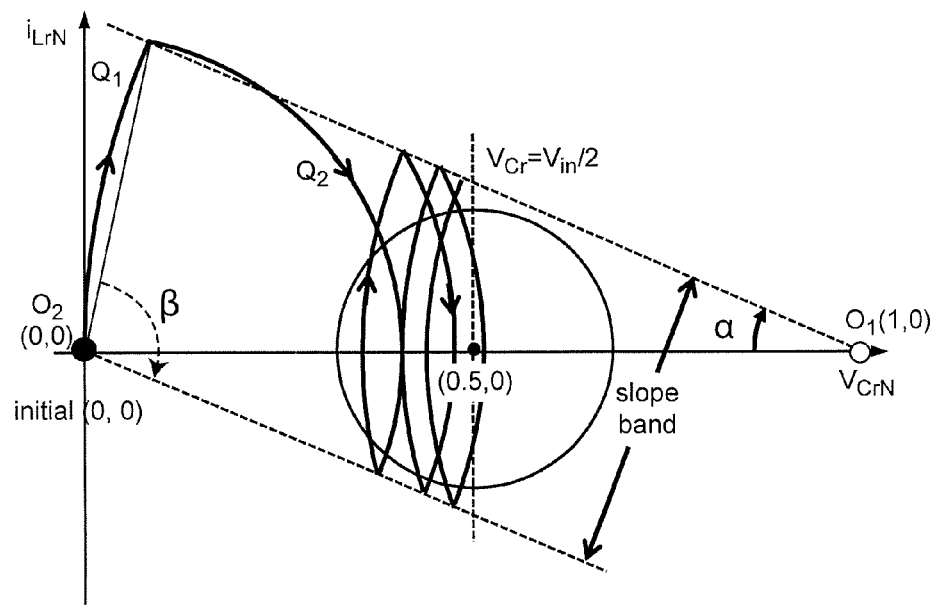
FIG. 18 is a state trajectory diagram illustrating a variation on FIG. 17 using a sloped current limiting band.

This process need not be exact and improved settling time that is somewhat less than optimal can be achieved when the state trajectories resemble those of FIG. 18 using either a half-bridge or full-bridge switching circuit. As shown in FIG. 18, operation similar to that of the third embodiment but which does not fully charge the resonant capacitor is essentially that of using a sloped current limitation band where the current limit change (e.g. linearly) as a function of voltage which can easily be achieved with simple comparators circuits. The sloping of the current limitation band functions somewhat similarly to simply allowing the first switching pulse to exceed the current limitation band and also somewhat similarly to the symmetrical current limitation band. The initial pulse electrical stress can be somewhat reduced with only slight electrical stress caused for a very few switching cycles thereafter. Compared with the embodiment of FIG. 15, the sloped current limits cause the initial switching cycle to be brought much closer to the steady state condition and can be completed more quickly. The electrical stress developed is less than the one-cycle embodiment. Accordingly, with the sloped current limitation band, a design trade-off can be exploited between electrical stress and start-up completion speed while still reducing electrical stress far below the stress that would otherwise be caused in the absence of the invention.

Figure 19:
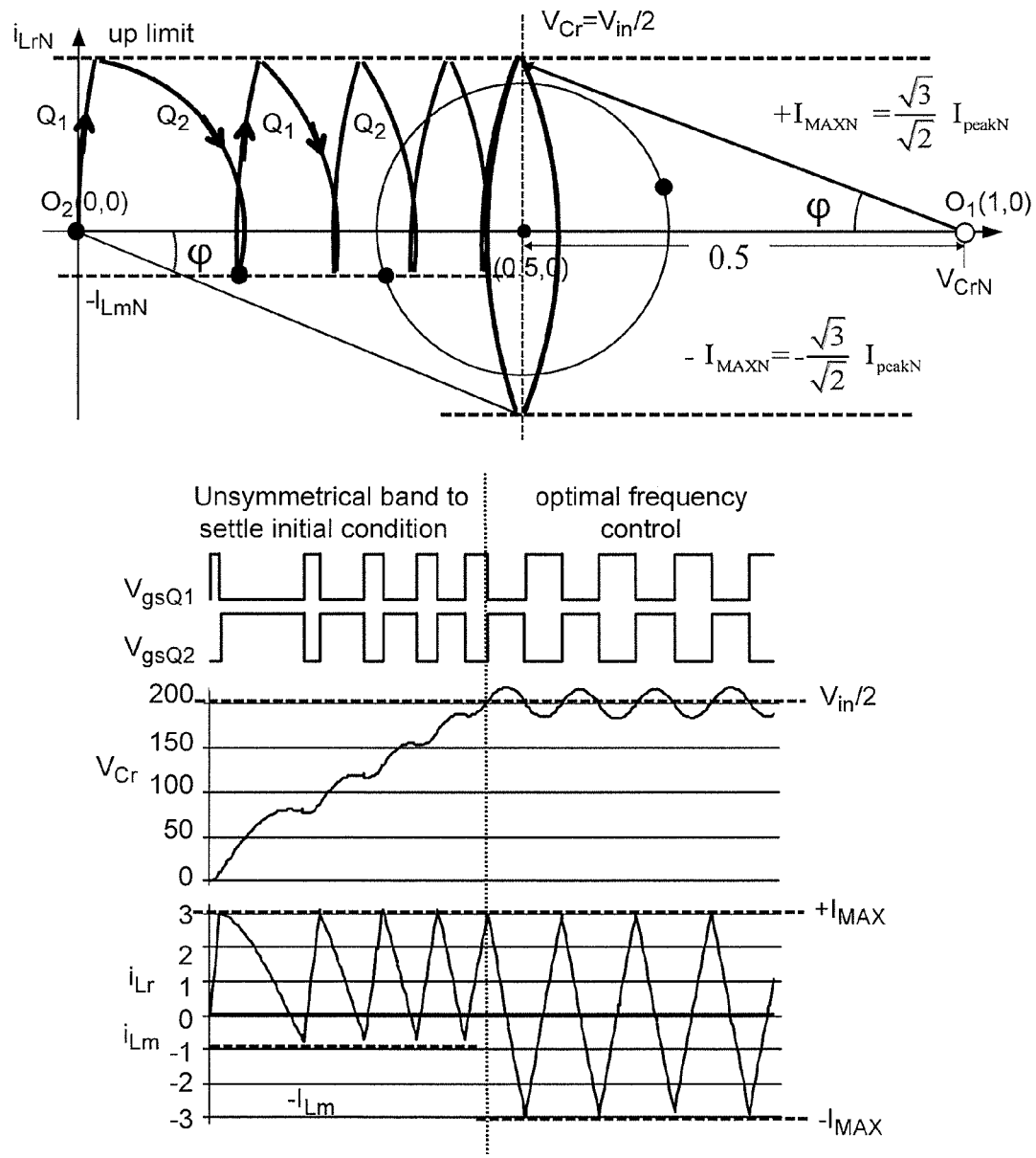
FIG. 19 is a state trajectory diagram for determining optimal switching frequency during and after start-up and corresponding time domain waveforms.

In any of the above-described embodiments of the invention, the initial settling time can be predicted as discussed above. After settling this initial condition to bring the capacitor voltage to one-half of the output voltage or the steady-state resonant capacitor voltage, the current limitation band is changed to being symmetrical to maximally transport the energy if the current limitation band is not already symmetrical. The change of the current limitation band from asymmetrical to symmetrical and the effects on the trajectories is illustrated in FIG. 19 and initiates the second stage of soft start-up in accordance with the invention. The conduction angle, ϕ, is thus $$\phi=\tan^{-1}(((3)^{1/2}/(2)^{1/2})I_{peak})/0.5.$$

At this time the conduction angles of Q1 and Q2 are the same and equal to $2\phi/\omega=T_1=T_2$. Thus after build-up of the resonant capacitor voltage to $V_{in}/2$, the switching frequency at start-up is $$f_{ss\_ini}=1/(T_1+T_2)$$

The corresponding time domain waveforms are also shown in FIG. 19.

Figure 20:
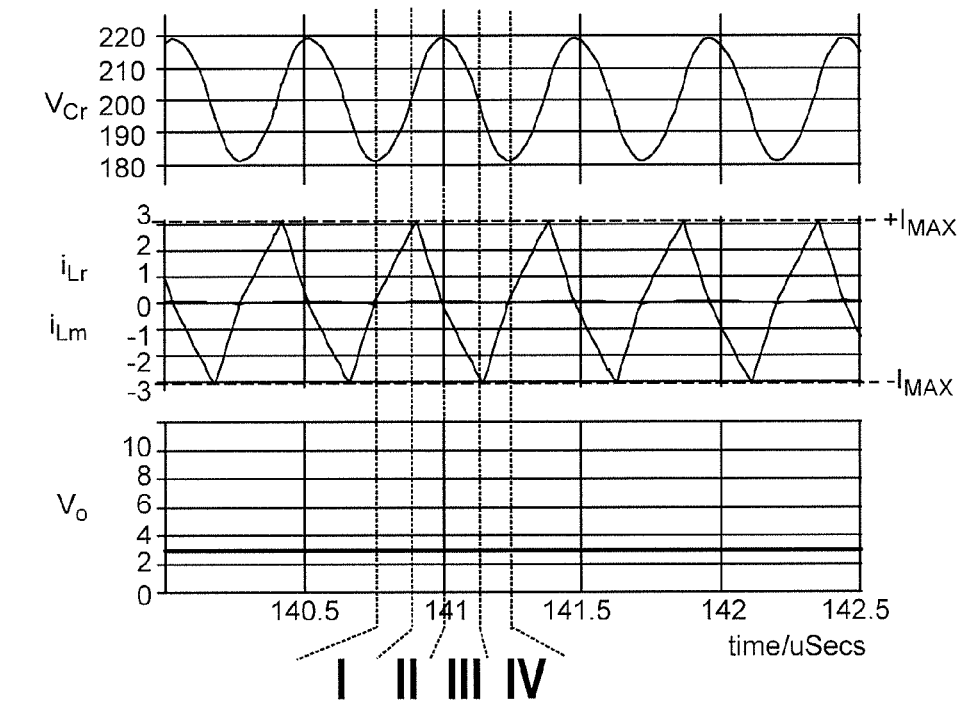
FIG. 20 is a state diagram and corresponding waveforms illustrating optimal trajectory control as $V_O$ increases.
Figure 20:
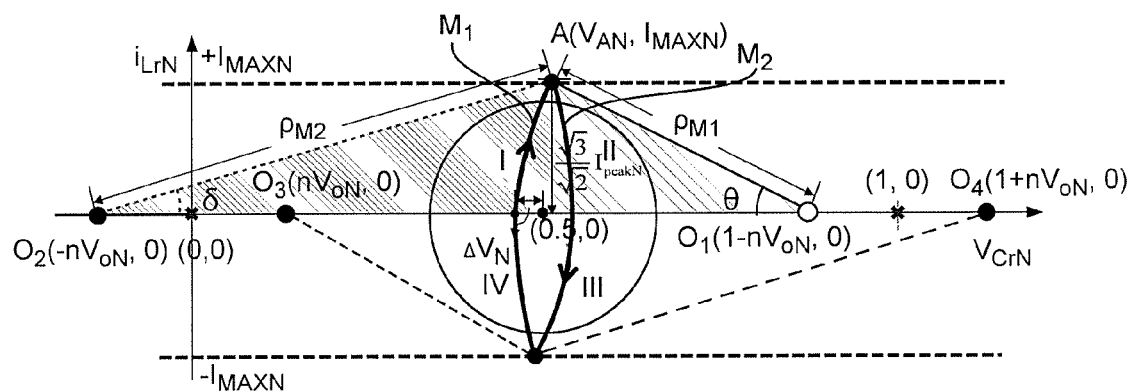

As the soft start-up continues, the output voltage begins to increase smoothly in accordance with the four modes illustrated in FIG. 11. In much the same manner as discussed above, by limiting the current band to correspond to $I_{Lr}$, the four trajectory portions are uniquely determined. The state trajectory diagram and time domain waveforms are illustrated in FIG. 20. Since the start-up is continuing and the output voltage has been built up to a non-zero value there will be four modes of operation, the Q1 trajectory for half-bridge switching or Q1, Q2 trajectory for full-bridge switching corresponding to modes M1 and M2 labeled I and II, having respective radii $\rho_1$ and $\rho_2$. Modes labeled III and IV are symmetrical and need not be considered. The time domain waveforms at the optimal frequency are also shown in FIG. 20.

Figure 21:
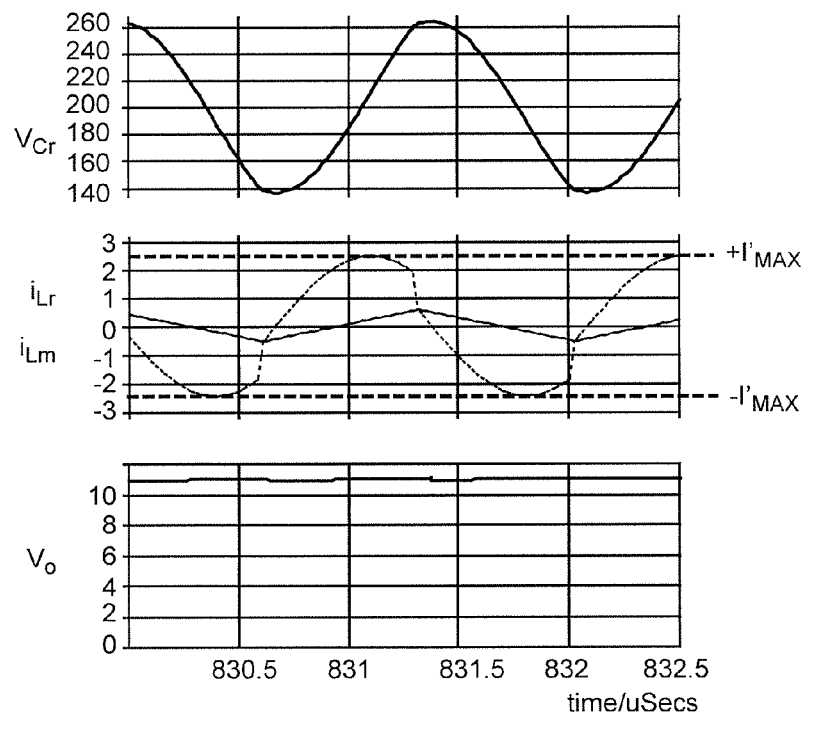
FIG. 21 is a state diagram and corresponding waveforms illustrating optimal trajectory control as $V_O$ approaches steady state.
Figure 21:
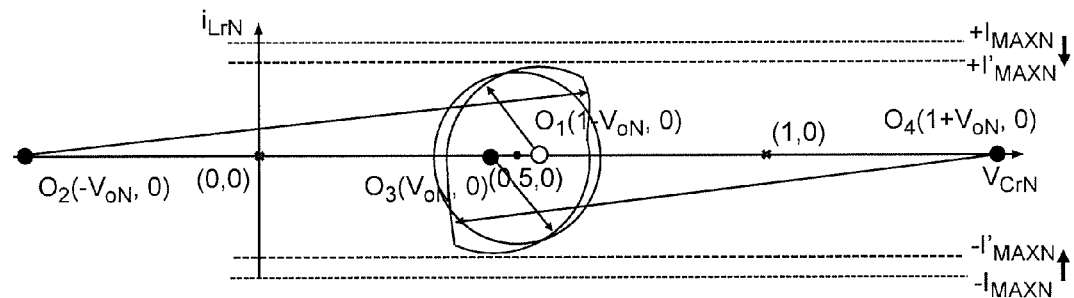

As the output voltage approaches steady state, the resonant current waveform changes from a triangle to a sinusoid as shown in FIG. 21. To keep the same RMS value, the current limitation band should decrease stepwise to $I_{peak}$ as $V_O$ increases. As before, when $V_O$ begins to increase, the two trajectory centers split into four centers, each corresponding to an equivalent circuit of FIG. 11. As before, two of these centers will approach the steady state value and the other two will separate. Therefore the radius of two of the trajectories will become small and the radius of the others will become large. At some point, the radius for two of the trajectory segments will become less than $\pm I_{max}$ and the maximum current as well as the switching points will shift. The change of shape of the overall trajectory toward the steady state circle as well as the change of current limitation band and switching points is illustrated in FIG. 21.

The optimal frequency at each instant as $V_O$ increases can be calculated as indicated in the above-incorporated article. In summary of that calculation, radii, $\rho_{M1}$ and $\rho_{M2}$, indicated in FIG. 20, are evaluated for each of the two modes of operation, M1 and M2, by determining the point where the trajectory I of mode M1 intercepts the current limit and the resonant capacitor voltage at point A for mode II and solving the triangles for each mode. The conduction angles $\theta$ and $\delta$ for modes I and II, respectively are then calculated as $$\theta = \sin^{-1}(((3)^{1/2}/(2)^{1/2})I_{peak})/\rho_{M1}$$

$$\delta = \sin^{-1}(((3)^{1/2}/(2)^{1/2})I_{peak}0/\rho_{M2}.$$

Thus, the optimal switching frequency at any level of $V_O$ as $V_O$ is built up to steady state is $$f_{ss\_opt} = 1/(2(\theta+\delta)/\omega_0).$$

Figure 22:
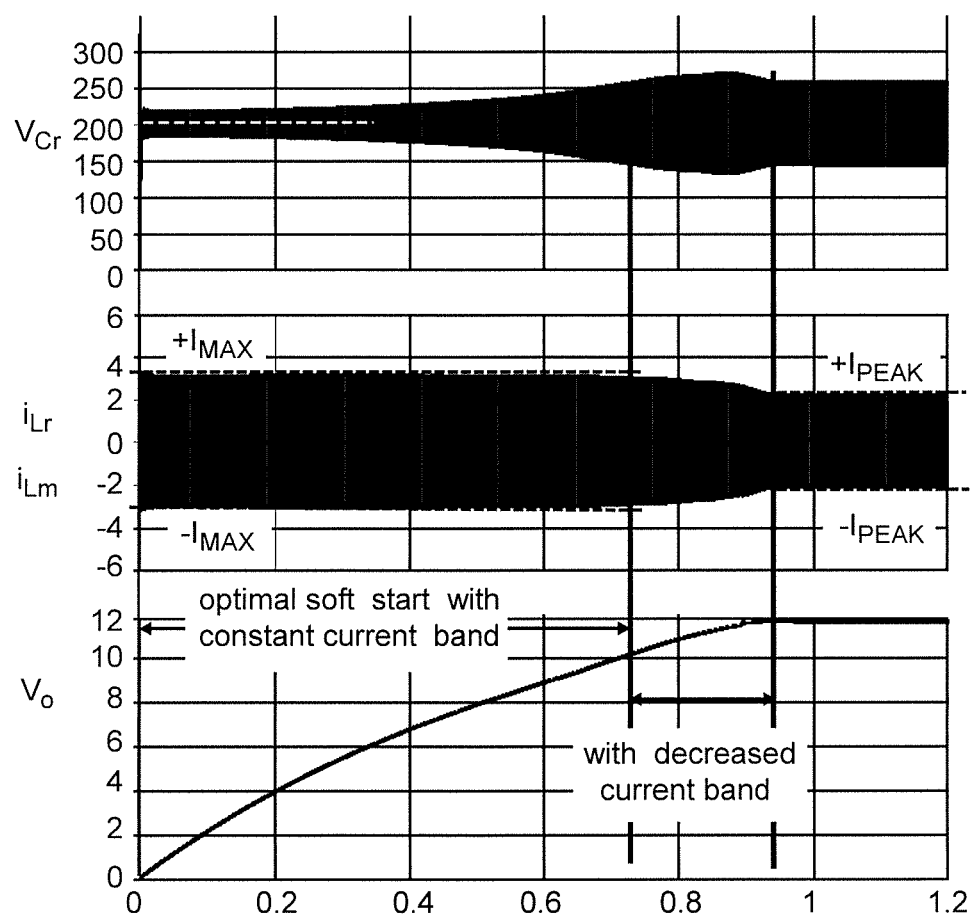
FIG. 22 is a graphical illustration of the entire optimal soft start-up process in accordance with the invention.

The entire soft start-up process in accordance with the invention is illustrated in FIG. 22. The process begins with a period of time which can be as short as a single switching cycle of Q1 and Q2 which is less than one switching cycle at the resonant frequency and the voltage on the resonant capacitor is built up to $V_{in}/2$ and during which $V_O$ is also built up. During this period switching is controlled by monitoring current and controlling switching when current equals the minimum and maximum currents of a current limitation band in accordance with any of the embodiments discussed above. During the same period the magnetizing inductance component of the inductor current also increases and continues to do so during a subsequent period during which the current limitation band is reduced and steady state, full load operation is settled.

In view of the foregoing, it is clearly seen that imposing a current limitation band and determining switching instants by monitoring resonant inductor current by current comparison establishes an optimal frequency to begin the start-up process. As the output voltage increases, the optimal switching frequency maps to the gain curves of the resonant power converter. Therefore, the frequency automatically is maintained at the optimum frequency for the level of the output voltage and settles smoothly to the resonant frequency. Accordingly, it is seen that the invention provides for substantial reduction or even elimination of soft start-up electrical stress in resonant power converters while allowing a substantial latitude in design flexibility and exploitation a trade-off between start-up speed and electrical stress; both of which are greatly improved over start-up behaviors in the absence of the invention. These effects are achieved in a relatively simple manner by controlling switching times in accordance with monitored inductor current limits until resonant capacitor bias is established and thereafter controlling switching frequency in accordance with the output voltage to settle the power converter into steady state operation.

While the invention has been described in terms of four embodiments which are each preferable for particular applications, those skilled in the art will recognize that the invention can be practiced with modification within the spirit and scope of the appended claims.

The invention claimed is:

1. A method of operating a switching resonant power converter comprising steps of setting a current limitation band, monitoring resonant inductor current, controlling switching times of switches of said switching resonant power converter during start-up to occur at times when monitored inductor current equals limits of said current limitation band thereby establishing a variable switching frequency until bias on a resonant capacitor reaches a steady state voltage, and allowing the power converter to assume a steady state mode of frequency regulation mode operation in accordance with build-up of output voltage.

2. The method as recited in claim 1, wherein said current limitation band is set to a positive current limit equal to the amplitude of a triangular waveform having the same RMS value as the full load steady state sinusoidal output waveform of said power converter.

3. The method as recited in claim 2, wherein a negative current limit of said current limitation band is set symmetrically to said positive current limit about a zero voltage level.

4. The method as recited in claim 2, wherein a negative current limit of said current limitation band is set to a smaller magnitude than a magnitude of said positive current limit.

5. The method as recited in claim 4, wherein said negative current limit is set to a level equal to the resonant current and the magnetizing current of a transformer in said power converter.

6. The method as recited in claim 4, wherein the current limitation band is altered to develop a full load steady state trajectory.

7. The method as recited in claim 2, wherein said switching is performed by a half-bridge circuit and the current limitation band is not imposed on a first pulse of input power from a power source to said resonant power converter.

8. The method as recited in claim 7, wherein a first switching cycle brings a resonant capacitor voltage to full steady state charge at a current equal to the positive current limit.

9. The method as recited in claim 2, wherein said switching is performed by a full bridge circuit and an initial switching pulse is shortened.

10. The method as recited in claim 9, wherein said initial switching pulse is shortened to cause a first trajectory to intersect with a trajectory determined by build up of output voltage due to said shortened initial pulse.

11. The method as recited in claim 2, wherein said current limitation band is sloped to decrease current limit values.

12. The method as recited in claim 1, wherein a negative current limit of said current limitation band is set symmetrically to said positive current limit about a zero voltage level.

13. The method as recited in claim 1, wherein a negative current limit of said current limitation band is set to a smaller magnitude than a magnitude of said positive current limit.

14. The method as recited in claim 13, wherein said negative current limit is set to a level equal to the resonant current and the magnetizing current of a transformer in said power converter.

15. The method as recited in claim 1, wherein said switching is performed by a half-bridge circuit and the current limitation band is not imposed on a first pulse of input power from a power source to said resonant power converter.

16. The method as recited in claim 15, wherein a first switching cycle brings a resonant capacitor voltage to full steady state charge at a current equal to the positive current limit.

17. The method as recited in claim 1, wherein said switching is performed by a full bridge circuit and an initial switching pulse is shortened to terminate at a current less than said current limit band.

18. The method as recited in claim 17, wherein said initial switching pulse is shortened to cause a first trajectory to intersect with a trajectory determined by build up of output voltage due to said shortened initial pulse.

19. The method as recited in claim 1, wherein said current limitation band is sloped to decrease current limit values.

20. A resonant power converter including a resonant circuit, a switching circuit to connect a power source to said resonant circuit, a current monitoring circuit to monitor current in said resonant circuit, and a control circuit for establishing switching times of said switching circuit to be at times when said current in said resonant circuit coincides with upper and lower current limits of a current limitation band thereby establishing a variable switching frequency during start-up and transitioning to frequency regulation mode control during steady-state operation.

\* \* \* \* \*